March 17, 1959     E. HAGENLOCHER     2,877,633
TORSIONALLY RESILIENT FLEXIBLE COUPLINGS
Original Filed Feb. 11, 1952
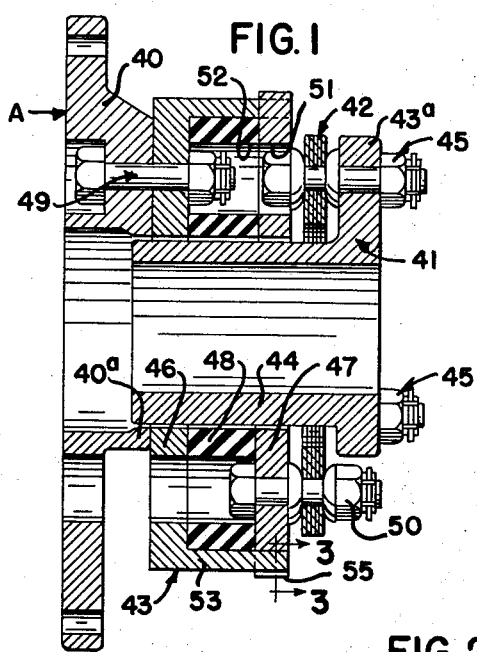
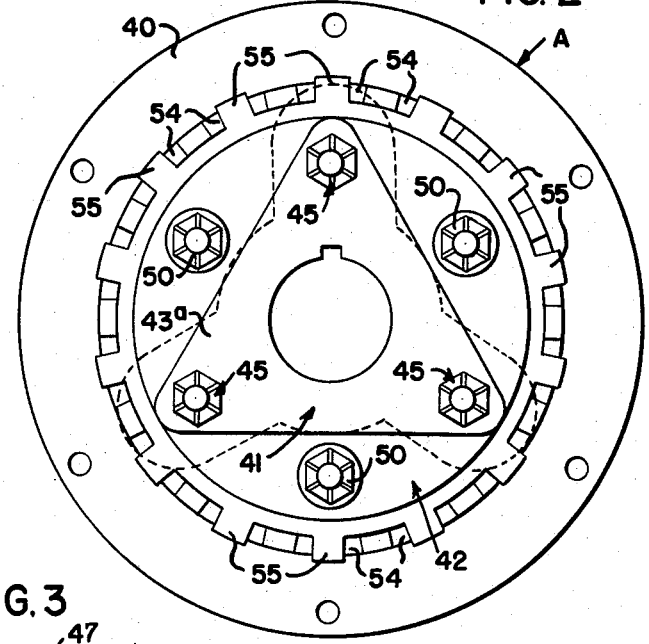
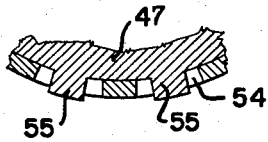
INVENTOR
Ernest Hagenlocher
BY
Lancaster, Allwine & Rommel
ATTORNEYS

United States Patent Office 2,877,633
Patented Mar. 17, 1959

2,877,633

TORSIONALLY RESILIENT FLEXIBLE COUPLINGS

Ernest Hagenlocher, Warren, Pa.

Original application February 11, 1952, Serial No. 271,008, now Patent No. 2,745,267, dated May 15, 1956. Divided and this application March 19, 1956, Serial No. 572,589

7 Claims. (Cl. 64—13)

This invention relates to improvements in flexible couplings. The present application is a division out of my parent application Serial No. 271,008, filed February 11, 1952 a part of which has issued as U. S. Patent 2,745,267, dated May 15, 1956.

The primary object of this invention is the provision of an improved flexible coupling of the general type set forth in U. S. Patent 2,182,711; generally being of a torsionally resilient type as shown in my U. S. Patent 2,593,877, with additional improved means for taking care of torsional deflection in the particular coupling of this application.

A further object of this invention is the provision of an improved flexible coupling structure which is well adapted for use in connection with machinery where heavy radial loads occur. Generally it includes a compact laminated laterally flexible steel disc set and an incorporated torsionally resilient construction for taking care of torsional stresses as an incident of relative turning movements between the shafts and coupling parts whereby to absorb and dampen disturbing oscillations, vibrations, and shocks incident to rotary motion.

Other objects and advantages of this invention will be apparent during the course of the following detailed description.

In the drawing, forming a part of this specification and wherein similar reference characters designate corresponding parts throughout the several views:

Figure 1 is a longitudinal cross sectional view taken through the improved coupling capable of taking care of angular misalignment, free end float and torsional stresses.

Figure 2 is an end elevation of the coupling structure of Figure 1 showing more particularly the bolting arrangement of the parts and the means for limiting stresses within the torsion absorbing structure of the coupling.

Figure 3 is a fragmentary cross sectional view taken substantially on the line 3—3 of Figure 1.

The coupling, generally designated at A has a single laterally flexible stainless steel disc set and is designed mainly for use with diesel engines. The coupling of this invention will operate with almost any kind of generator adapted for use with an engine. That is, change of generators can be made and difficulties due to torsional disturbances will not be encountered. It is particularly well adapted to assume heavy radial loads.

The coupling, except for torsional angular deflection improvement, is generally shown in U. S. Patent 2,251,-722. It includes a fly-wheel adapter flange or member 40 and the driven shaft connecting flange or member 41; a laminated steel disc set 42 and angular torsional deflection means 43 bolted or connected between the flanges 40 and 41.

The laminated steel disc set 42 comprises a plurality of preferably stainless steel laterally flexible disc rings.

The shaft coupling part 41 includes a flange portion 43ª and a hub 44 which enters the opening 40ª of the adapter to prevent dropping of the machine and shaft connected parts in event of accidents. Flanges 43ª may be triangular in shape and connected by bolt arrangements 45 to the laminated steel disc set 42.

The torsional deflecting structure 43 includes metal plates or discs 46 and 47 having a sandwich rubber core 48 vulcanized or otherwise bonded to the facing surfaces thereof, as conventionally understood. The plate 46 is preferably secured by bolt sets 49 to the adapter 40 and the other plate or disc 47 is connected by bolt sets 50 to the laminated disc sets 42 in circumferentially staggered relation with respect to the bolt sets 45 which connect the disc set 42 to the shaft flange 41. Clearance openings 51 and 52, in aligned relation, are provided through the plate 47 and the core 48, freely receiving the heads and nuts of the bolt sets 45 and 49 therein, as shown in Figure 1.

I provide a means for limiting angular deflection of the torsionally resilient assemblage so as to prevent overstressing of the rubber core 48. It includes an annular flange 53 upon the sandwich plate 46 circumferentially beyond the core 48. At its free marginal edge it is provided with spaced recesses 54, as shown in Figures 2 and 3. The marginal circumference of the plate 47 is provided with teeth 55 freely projecting into the recesses 54 and of such width that the sides and, inner circumferential edges thereof, are spaced from the facing edges of the recesses 54 and inner circumferential surfaces.

Various changes in the shape, size and arrangement of parts may be made to the form of invention herein shown and described without departing from the spirit of the invention or scope of the claims.

I claim:

1. A flexible coupling comprising a fly-wheel adapter and connecting flange, a driven shaft coupling part, a torsion coupling comprising a pair of rigid plates and a rubber core connected with and therebetween, means bolting one of said rigid plates to said adapter and connecting flange, a set of metal laminations, means connecting said set of laminations to said driven shaft coupling part, means connecting said metal laminations to the other rigid plate of the torsion coupling at locations circumferentially spaced from the locations where said set is connected to the driven shaft coupling part.

2. A coupling such as described in claim 1 wherein means is provided to restrict the degree of annular movement of said two torsion coupling plates to limit the torsional stresses upon said rubber core.

3. In a coupling structure the combination of a coupling flange having a central opening therein, a second coupling flange having a hub portion with an opening therethrough, said hub portion being of a diameter so that the same loosely extends into the opening of the first mentioned flange permitting relative tilting motions of said coupling flanges, a torsionally deflecting structure including a pair of metal plates with a rubber sandwich core bonded therebetween, means for bolting one of said plates to the first mentioned coupling flange, a laminated transverse disc set bolted at circumferentially spaced locations to the second mentioned coupling flange in surrounding relation with the hub of the second mentioned coupling flange, means bolting said laminated disc set to the other metal plate of the torsion deflecting structure in circumferentially staggered relation with respect to the bolts which connect the disc set to the second mentioned coupling flange.

4. A coupling structure as defined in claim 3 in which means is provided upon the plates of said torsion deflecting structure in interengaging relation permitting of limited torsional deflection of the core thereof.

5. In a torsionally resilient flexible coupling adapted to receive heavy radial loads the combination of a fly-wheel adapter coupling flange having a central opening therein, a driving shaft coupling flange having a sleeve type hub and an attaching flange, the hub remote from the shaft coupling flange extending into the central opening of the first mentioned coupling flange in loose radially spaced relation from the wall surfaces of said central opening, a set of laminated transversly flexible metal discs connected at circumferentially spaced locations to the flange of the drive shaft coupling, and a torsionally deflecting rubber sandwich type structure connected to the adapter flange between it and the flange of the drive coupling, means connecting the sandwich to the laminated disc set at locations upon said disc set which are staggered with respect to the connection locations of said disc set to the drive coupling flange.

6. A coupling structure as described in claim 5 in which the torsionally deflecting sandwich structure includes a pair of metal plates with a rubber core bonded therebetween and to the plates, and wherein one of said metal plates is fixedly connected to the adapter flange and the other metal plate has connecting locations as aforesaid with the disc set which are staggered with respect to the disc set connections to the drive coupling flange.

7. The coupling assemblage as defined in claim 5 in which the rubber sandwich is provided with a central opening therethrough and receiving therein the hub of the adapter in radially spaced relation therewith.

References Cited in the file of this patent

UNITED STATES PATENTS 2,499,093  Fast _____ Feb. 28, 1950

FOREIGN PATENTS 532,393  Great Britain _____ Jan. 23, 1941